Nov. 3, 1942.                G. G. SMITH                2,300,529
                             REFRIGERATOR
                         Filed March 13, 1941           2 Sheets-Sheet 1
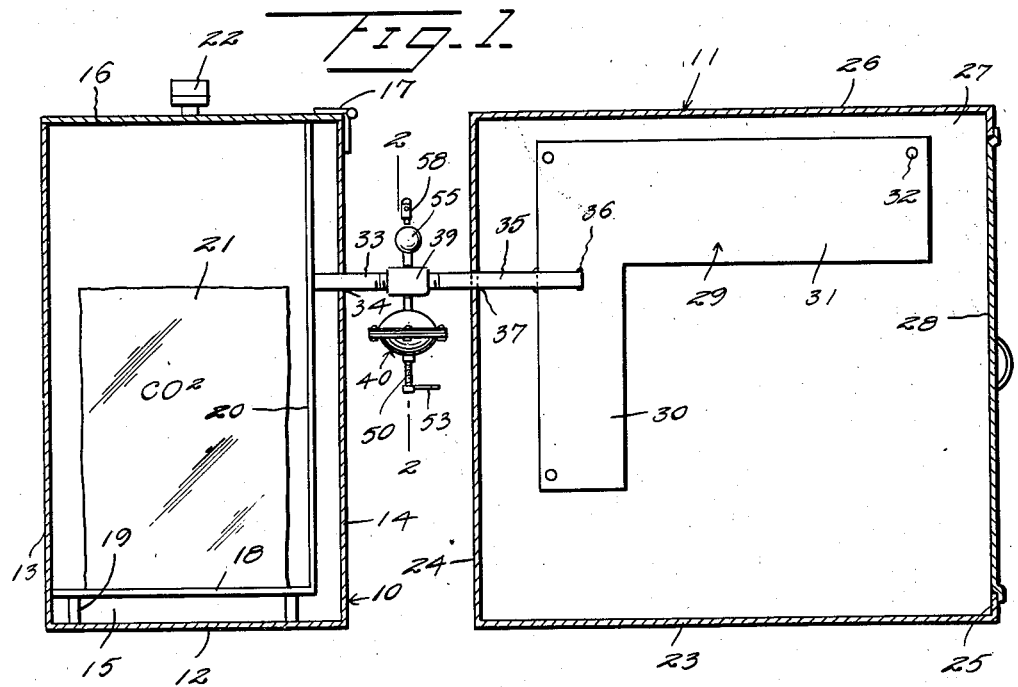
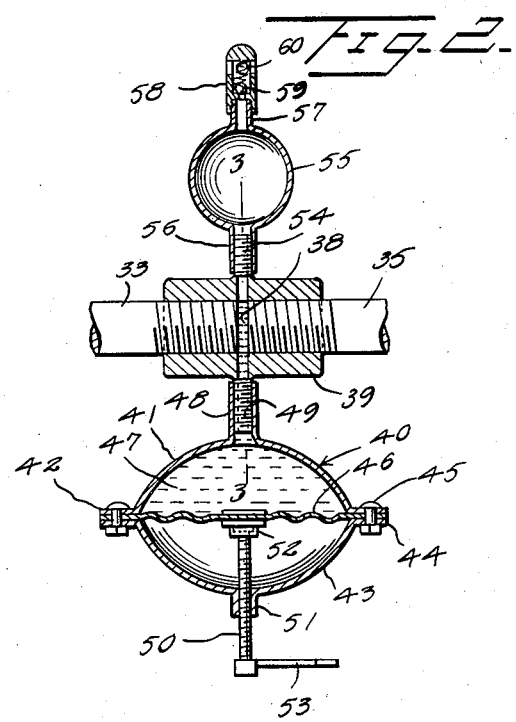
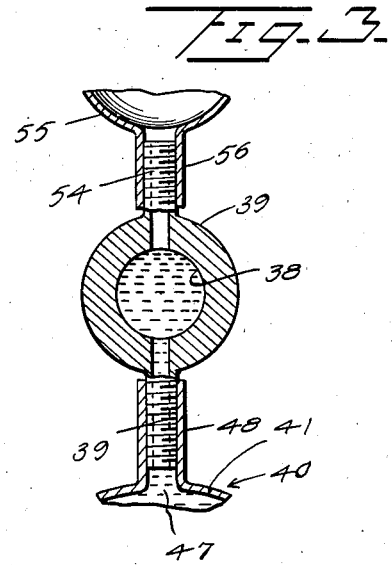
Inventor
G. G. Smith
By Kimmel & Crowell
Attorneys Nov. 3, 1942.   G. G. SMITH   2,300,529
REFRIGERATOR
Filed March 13, 1941   2 Sheets-Sheet 2
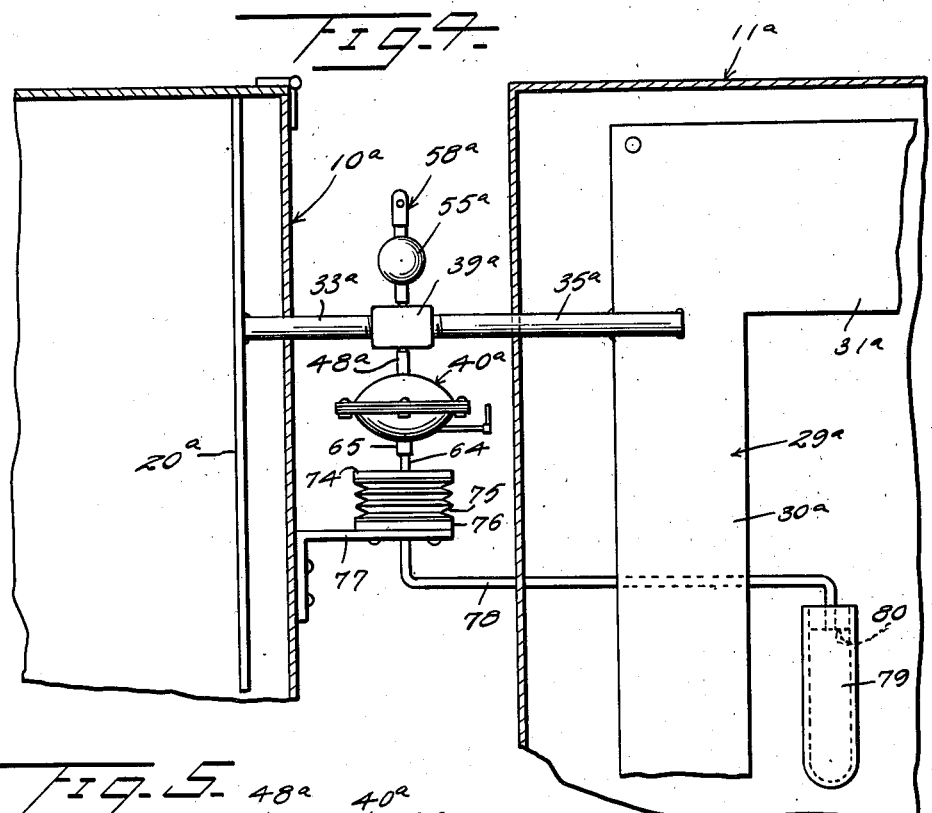
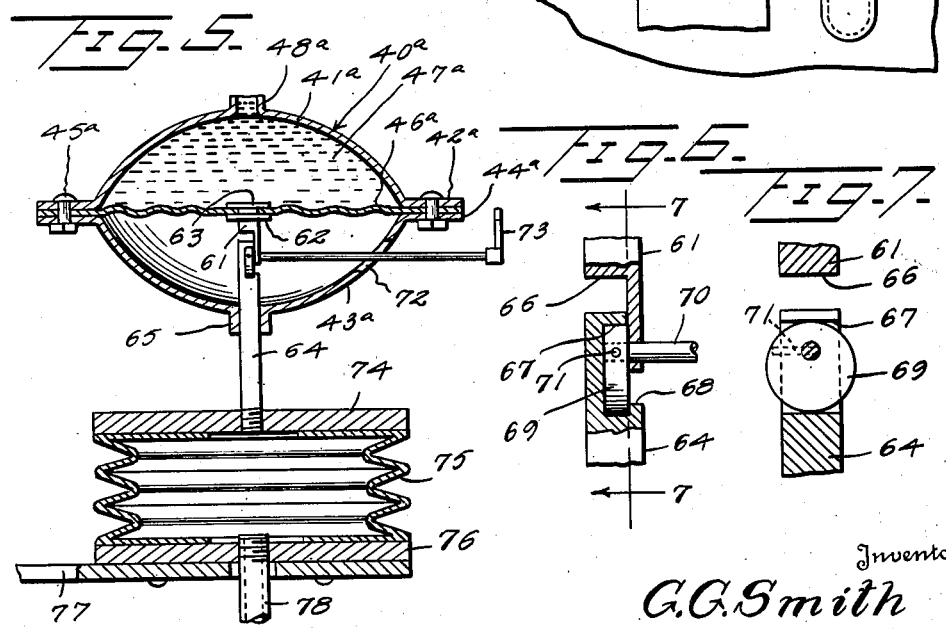
Inventor
G. G. Smith
By Kimmel & Crowell
Attorneys Patented Nov. 3, 1942

2,300,529

UNITED STATES PATENT OFFICE 2,300,529

REFRIGERATOR

Gustav G. Smith, Portland, Oreg.

Application March 13, 1941, Serial No. 383,239

4 Claims. (Cl. 62—2)

This invention relates to refrigerators and more particularly to a refrigerator embodying the use of carbon dioxide or $CO_2$.

An object of this invention is to provide a refrigerator in which the cold emanating from a cake of $CO_2$ is conducted by means of heat conducting metal to the food compartment.

Another object of the invention is to provide, in a refrigerator of this kind, an improved means whereby the conduction of cold from the cake of $CO_2$ may be finely regulated or controlled so as to provide for the desired temperature in the food compartment.

A further object of this invention is to provide a refrigerator including the combination of a cold compartment for receiving a cake of $CO_2$, a food compartment spaced from and non-communicable with respect to the cold compartment, and heat conducting means connecting the two compartments together.

A further object of this invention is to provide a refrigerator of this type wherein the two compartments are connected together by heat transferring or conducting means and the amount of heat transfer is regulated by a heat conducting liquid having a low freezing point, such as alcohol or the like.

A further object of this invention is to provide a refrigerator of this kind wherein the heat transfer controlling fluid may be either manually or thermostatically regulated to provide for the desired amount of heat transfer.

Heretofore refrigerators of this type have been provided in which a solid body or cake of carbon dioxide ($CO_2$) has been used as the cooling medium and the cold emanating from the body, which is commonly termed "dry ice," is conducted or transferred to a food compartment in such a manner that the gas sublimating from the body will not contaminate the food. However, in such prior devices no provision was made whereby the degree of transfer may be regulated or controlled, so that when the body of carbon dioxide was initially placed in the cold chamber the amount of heat transferred was greater than the amount desired, resulting in an undesired low temperature in the food compartment. It is, therefore, an object of this invention to provide a device which will overcome the objectionable features of these prior devices and provide an even temperature in the food compartment irrespective of the size of the body of the carbon dioxide.

A still further object of this invention is to provide a device of this type which will permit of the variation, either manually or automatically, in the heat transfer between the cold compartment and the food compartment, so that an even temperature may be maintained in the food compartment irrespective of the size of the body of carbon dioxide.

With these and other objects in view, the invention consists in certain novel features of construction as hereinafter shown and described and then specifically pointed out in the claims, and in the drawings illustrative of the preferred embodiment of the invention.

Figure 1 is a diagrammatic view, partly in section, of a refrigerating unit constructed according to an embodiment of this invention.

Figure 2 is an enlarged vertical section taken on the line 2—2 of Figure 1.

Figure 3 is a transverse sectional view, taken on the line 3—3 of Figure 2.

Figure 4 is a fragmentary diagrammatic view of an improved modified form of refrigerating unit.

Figure 5 is a vertical section, taken through the regulating means for the heat conducting members.

Figure 6 is a fragmentary side elevation, partly in section, through the adjusting means for the regulating unit; and Figure 7 is a sectional view taken on the line 7—7 of Figure 6.

Referring to the drawings, and first to Figures 1 to 3 inclusive the numeral 10 designates generally a cold chamber and the numeral 11 designates generally a food chamber which, in the present instance, is spaced apart and non-communicating with respect to the cold chamber 10. The food chamber 11, as shown in Figure 1, is at one side of the cold chamber 10, but it will be understood that, if desired, the food chamber 11 may be disposed in any other suitable position with respect to the cold chamber 10.

The cold chamber 10 comprises a housing including a bottom wall 12, side walls 13 and 14 and end walls 15. The closure or top wall 16 is hingedly secured, as at 17, to the side wall 14 and is adapted to close the upper end of the chamber 10. It will, of course, be understood that, if desired, the closure 16 may be disposed in one of the side or end walls. An inner bottom wall 18 is disposed in upwardly spaced relation to the bottom wall 12 being secured in upwardly spaced relation by means of supporting members 19. One edge of the bottom wall 18 is disposed in spaced relation to the side wall 14 and an inner side wall 20 extends upwardly from the adjacent edge of the inner bottom 18 and is disposed in spaced relation with respect to the side wall 14. If desired, the inner bottom 18 may be formed integral with the inner side wall 20 and these walls are preferably constructed of metal having a relatively high coefficient of heat transfer or heat conductivity. A solid body or cake 21, which is formed of solidified carbon dioxide ($CO_2$) is adapted to rest on the inner bottom 18 and constitutes the cold generating means which is positioned in direct contact with the inner bottom 18. The body 21 may, if desired, be also positioned in direct contact at its inner portion with the vertical inner side wall 20 so that the cold emanating from the body 21 will be transferred directly to the inner side wall 20. The closure 16 may be provided with outwardly opening gas escape valve structure 22 of conventional construction so that the gas sublimated from the body 21 will be permitted to escape and thus prevent the formation of undue pressure within the cold chamber 10.

The food chamber 11 is herein shown as a closed housing, but it will be understood that a suitable closure which may be hinged, or the like, is associated with the food chamber 11 so that free access may be had to the interior of the chamber 11. The chamber 11 comprises a bottom wall 23, side walls 24 and 25, top wall 26 and end walls 27. As shown in Figure 1, the side wall 25 may be provided with a suitable closure 28, the closure 28 being shown diagrammatically so that ready access may be had to the interior of the chamber 11.

A heat exchanging element, generally designated at 29, is disposed within the food chamber 11, and in the present instance it comprises a substantially L-shaped plate having a vertical leg 30 and a horizontal leg 31. The plate or element 29 is adapted to be supported in spaced relation to an end wall 27 and in spaced relation to the inner side wall 24 by supporting members 32 or the like. The supporting members 32 may be similar to the supporting members 19, shown in Figure 1. A heat conducting rod or member 33 is secured at one end to the heat exchanging plate 20 and the rod 33 extends through an opening 34 formed in the inner side wall 14. A second heat conducting rod or member 35 is secured as by welding 36 or other suitable fastening means, to the plate 29 at the upper portion of the vertical leg 30 thereof. The rod or heat conducting member 35 extends through an opening 37 provided in the inner side wall 24 and, in the present instances, is disposed in axial alinement with the heat conducting member 33. The adjacent or confronting ends of the heat conducting members 33 and 35 are spaced apart as shown in Figure 2, so as to form a chamber 38.

A substantially cylindrical connector 39 is threaded onto the adjacent ends of the heat conducting members 33 and 35 and preferably the connector 39 is formed of material having a substantially low coefficient of heat conductivity.

A liquid reservoir or housing, generally designated as 40, is disposed below the connector 39 and comprises an upper housing member 41 provided with a flange 42 and also includes a lower housing member 43 which is complementary to the upper housing member 41 and which is provided with a marginal flange 44. The flanges 42 and 44 are secured together by fastening devices 45. The upper housing member 41 is separated on the interior thereof from the interior of the lower housing member 43 by means of a flexible diaphragm 46. The marginal edge portions of the diaphragm 46 are interposed between the two flanges 42 and 43. The space 47 above the diaphragm 46 constitutes the liquid chamber in which a non-frigid liquid is adapted to be positioned. This non-frigid liquid is preferably a liquid having a substantially high co-efficient of heat conductivity but which has a very low freezing point so that the liquid will not freeze or coagulate under any temperature which may be transferred from the heat conducting member 33 to the heat conducting member 35. The upper housing member 41 is provided with a nipple or tubular extension 48 which is adapted to be threaded onto a nipple 49 which is carried by or formed integral with the connecting member 39. The nipple 49 communicates with the liquid chamber or space 38.

In order to provide a means whereby the amount of liquid which is positioned in the regulating chamber 38 may be manually controlled I have provided a threaded shaft or bar 50 which is threaded through a bushing 51 carried by the lower housing member 43. The inner or upper end of the shaft 50 is swivelly mounted in a bushing 52 which is fixed to substantially the center of the diaphragm 46. The combined operator and indicating member 53 is fixed to the outer or lower end of the shaft 50 and provides a means whereby the shaft 50 may be manually rotated so as to flex the diaphragm 46 to the desired degree and thereby regulate the amount of liquid which is to be disposed in the transfer chamber 38.

A diametrically and upwardly extending nipple 54 is carried by the connector 39 and communicates at its lower end with the transfer chamber 38. An expansion housing 55 which is provided with a threaded nipple 56, is threaded onto the nipple 54 and provides a means whereby any air above the liquid in the transfer chamber 38 may readily expand. The expansion chamber 55 is also provided at its upper end with a nipple 57 diametrically opposite to the nipple 56 and a combined cap and safety valve 58 is threaded onto the upper nipple 57. The safety valve 58 includes a spring pressed valve member 59 and an exhaust opening 60 so that when undue pressure is present in the expansion chamber 55 this pressure may be released by unseating of the upwardly opening valve member 58 and discharge or exhaust of the air through the vent or opening 60.

Referring now to Figures 4 to 7 inclusive there is here disclosed a refrigerator unit similar to the unit shown in Figure 1 with the exception that the regulating means for regulating the transfer of heat from the cold chamber to the food chamber is thermostatically controlled. The cold chamber 10a is similar in every detail to the cold chamber 10 and there is positioned in the chamber 10 a heat conducting member embodying a horizontally disposed inner bottom plate similar to plate 18 and a vertically disposed inner side wall 20a. The solid body of carbon dioxide is adapted to be disposed on the inner bottom similar to 18 and the cold from the solid cake of carbon dioxide is adapted to be absorbed by and conducted by the plate 20a and the bottom supporting the solid cake of carbon dioxide. A food compartment 11a, similar to the compartment 11, is disposed in spaced relation to and in non-communicating relation with respect to the cold chamber 10a and food chamber 11a has positioned therein a substantially L-shaped heat exchanging element 29a. The element 29a is provided with a vertical leg 30a and a horizontal leg 31a.

A heat conducting rod or member 33a is fixed at one end to the heat exchanging plate 20a and a second heat conducting rod or member 35a is fixed to the heat exchanging plate 29a and, in the present instance, is in axial alinement with the heat conducting rod 33a. A substantially cylindrical connector 39a connects the confronting ends of the head conducting members 33a and 35a together and the confronting ends of the heat conducting members 33a and 35a are spaced apart to provide a heat transfer chamber similar to the transfer chamber 38, shown in Figures 2 and 3. A fluid reservoir 40a is connected by means of a nipple 48a to the connecting member 39a and an expansion member 55a extends upwardly from the connector 39a and communicates therewith in a manner similar to the structure shown in Figures 2 and 3. A safety valve structure 58a which also constitutes a cap, is mounted on the expansion member 55a. The combined cap and safety valve member 58a provides a means not only for the release of air pressure in the expansion member 55a but also provides a means whereby the desired amount of heat transferring liquid may be placed in the reservoir 40a.

The reservoir 40a includes an upper housing member 41a having a marginal flange 42a and also includes a lower housing member 43a having a marginal flange 44a. A flexible diaphragm 46a divides the liquid chamber 47a from the lower housing member 43a and the diaphragm 46a is interposed between the flanges 42a and 44a and secured there-between by fastening devices 45a. A rod or shaft 61 is disposed within the lower housing member 43a and is secured by means of washers 62 and 63 to the axial center of the diaphragm 46a. A second rod or shaft 64 is slidable through a bushing 65 carried by a lower housing 43a. The inner shaft or rod 61 is provided with a cutout 66 in one side thereof and the upper end of the rod or shaft 64 is formed with a transverse opening or cam track 67 which communicates with a cutout 68 also formed in the upper portion of the shaft or rod 64. A circular cam member 69 is rotatably engageable within the track 67 and a cam operating shaft 70 is secured at one end by means of a pin 71 to the cam 69 and extends horizontally and outwardly through an elongated slot and opening 72 formed in the lower housing member 43a. A handle or indicator 73 is fixed to the outer or extended end of the shaft 72. Rotation of the cam member 69 will move the overlapping ends of the two shaft members 61 and 64 relative to each other so as to increase or decrease the combined length of these two shafts and thereby flex the diaphragm 46a to the desired degree.

The lower shaft 64 is connected at its lower end to an upper plate 74 which closes the upper end portion of a flexible bellows 75. The lower plate 76 is secured to the lower portion of the bellows 75 and the lower plate 76 is preferably supported from the cold chamber 10a by means of an L-shaped bracket 77. A pipe 78 is connected at one end to the lower plate 76 and communicates with the interior of the bellows 75. The upper end of the bellows 75 is closed by the plate 74. The pipe 78 extends from the bellows 75 into the food chamber 10a. A gas receptacle 79, which is provided with a plug or closure 80 at its upper end, is disposed within the food chamber 11a and the plug 80 is threaded or otherwise secured onto the opposite end of the pipe 78. The gas positioned in the gas receptacle 79 is preferably of a character which is adapted to expand or contract under the varying temperatures in the food chamber 11a and upon expansion of the gas in the gas receptacle 79 this expanded gas will also expand within the bellows 75 and thereby push upwardly and vertically the two connected shafts 61 and 64 so as to raise or flex the diaphragm 46a upwardly. The upward flexing of the diaphragm 46a will cause the fluid chamber 47a to be reduced in area and the fluid in the chamber 47a will be forced into the heat transfer chamber between the confronting ends of the heat conducting members 33a and 35a.

In the use and operation of this refrigeration unit a solid cake of carbon dioxide is adapted to be positioned in the cold chamber 10 resting on the inner bottom member 18. The cold emanating from the body 21 is communicated, by contact with the bottom member 18 and the cold of the inner bottom 18 is communicated to the inner side wall 20. The cold or heat of the inner side wall 20 is conducted, by means of the heat conducting member 33, to the heat conducting member 35 which is fixed to the heat exchanging member 29 in the food compartment 11. The amount of heat transferred from the heat conducting member 33 to the heat conducting member 35 is manually controlled or regulated in Figures 1 to 3 inclusive by adjustment of the diaphragm 46. As an example, if it is desired to reduce the amount of heat conducted from the conducting member 33 to the conducting member 35 the diaphragm 46 is flexed downwardly thereby enlarging the liquid chamber 47. If it is desired to increase the amount of heat transferred between the conducting members 33 and 35 the diaphragm 46 is flexed upwardly thereby reducing the liquid chamber 47 and forcing the liquid into the heating transferring chamber 38.

The structure shown in Figures 4 to 7 inclusive operates somewhat similar to the structure shown in Figure 3 with the exception that the amount of heat transferring liquid in the transfer chamber between the conducting members 33a and 35a is thermostatically controlled by the expansion and contraction of the gas in the gas receptacle 79 which will cause the expansion or contraction of the bellows 75. Expansion or contraction of the bellows 75 will raise or lower the diaphragm 46a. The amount or degree of flexing of the diaphragm 46a may be adjusted by adjustment of the cam 69 which will lengthen or shorten the combined length of the two shafts 61 and 64.

What I claim is:

1. A refrigerator comprising a cold chamber adapted to receive a solid body of carbon dioxide, a food chamber spaced from and non-communicating with said cold chamber, a heat exchanging member in said cold chamber in spaced relation to the walls of said cold chamber and supporting said body in said cold chamber, a second heat exchanging member in said food chamber and spaced from the walls thereof, a heat conducting member fixed at one end to said first heat exchanging member and extending therefrom through a wall of said cold chamber, a second heat conducting member fixed at one end to said second heat exchanging member and extending therefrom through a wall of said food chamber, a coupling member having a substantially low coefficient of heat conductivity connecting the extended ends of said conducting members together and forming a heat transfer chamber between said extended ends, a heat conducting liquid engageable in said transfer chamber, a liquid reservoir communicating with said transfer chamber, a flexible wall in said reservoir, means for flexing said flexible wall to thereby increase or decrease the area of said reservoir, variation in the area of said reservoir affecting the quantity of liquid in said transfer chamber, an expansion chamber communicating with said transfer chamber, and a combined safety valve and filling cap carried by said expansion chamber.

2. A refrigerator comprising a cold chamber adapted to receive a solid body of carbon dioxide, a food chamber spaced from and non-communicating with said cold chamber, a heat exchanging member in said cold chamber in spaced relation to the walls of said cold chamber and supporting said body in said cold chamber, a second heat exchanging member in said food chamber and spaced from the walls thereof, a heat conducting member fixed at one end to said first heat exchanging member and extending therefrom through a wall of said cold chamber, a second heat conducting member fixed at one end to said second heat exchanging member and extending therefrom through a wall of said food chamber, a coupling member having a substantially low coefficient of heat conductivity connecting the extended ends of said conducting members together and forming a heat transfer chamber between said extended ends, a heat conducting liquid engageable in said transfer chamber, a liquid reservoir communicating with said transfer chamber, a flexible wall in said reservoir, a threaded shaft carried by said reservoir and swivelly connected with said flexible wall, and an operator carried by said shaft, flexing of said flexible wall varying the capacity of said reservoir and simultaneously varying the quantity of fluid in said transfer chamber.

3. A refrigerator comprising a cold chamber adapted to receive a solid body of carbon dioxide, a food chamber spaced from and non-communicating with said cold chamber, a heat exchanging member in said cold chamber in spaced relation to the walls of said cold chamber and supporting said body in said cold chamber, a second heat exchanging member in said food chamber and spaced from the walls thereof, a heat conducting member fixed at one end to said first heat exchanging member and extending therefrom through a wall of said cold chamber, a second heat conducting member fixed at one end to said second heat exchanging member and extending therefrom through a wall of said food chamber, a coupling member having a substantially low coefficient of heat conductivity connecting the extended ends of said conducting members together and forming a heat transfer chamber between said extended ends, a heat conducting liquid engageable in said transfer chamber, a liquid reservoir communicating with said transfer chamber, a flexible wall in said reservoir, a bellows, means connecting said bellows with said flexible wall to thereby vary the capacity of said reservoir upon expansion or contraction of said bellows, a gas receptacle in said food chamber, and a pipe connecting said receptacle with said bellows whereby variation in the temperature of said food chamber will expand or contract said bellows and thereby vary the quantity of liquid in said transfer chamber in accordance with the temperature in said food chamber.

4. A refrigerator comprising a cold chamber adapted to receive a solid body of carbon dioxide, a food chamber spaced from and non-communicating with said cold chamber, a heat exchanging member in said cold chamber in spaced relation to the walls of said cold chamber and supporting said body in said cold chamber, a second heat exchanging member in said food chamber and spaced from the walls thereof, a heat conducting member fixed at one end to said first heat exchanging member and extending therefrom through a wall of said cold chamber, a second heat conducting member fixed at one end to said second heat exchanging member and extending therefrom through a wall of said food chamber, a coupling member having a substantially low coefficient of heat conductivity connecting the extended ends of said conducting members together and forming a heat transfer chamber between said extended ends, a heat conducting liquid engageable in said transfer chamber, a liquid reservoir communicating with said transfer chamber, a flexible wall in said reservoir, a bellows, an extendible connecting means connecting said bellows with said flexible wall, means for extending or contracting said connecting means, and thermostatic means connected with said bellows for expanding or contracting said bellows in accordance with the temperature in said food chamber.

GUSTAV G. SMITH.